US005179970A

United States Patent [19]

Jarocki et al.

[11] Patent Number: 5,179,970

[45] Date of Patent: Jan. 19, 1993

[54] BEVERAGE DISPENSING VALVE

[75] Inventors: George J. Jarocki, Atlanta, Ga.; Tadeusz M. Drzewiecki, Rockville, Md.

[73] Assignee: The Coca-Cola Company, Atlanta, Ga.

[21] Appl. No.: 419,290

[22] Filed: Oct. 10, 1989

Related U.S. Application Data

[63] Continuation-in-part of Ser. No. 112,906, Oct. 23, 1987, abandoned.

[51] Int. Cl.[5] .......... G05D 11/13

[52] U.S. Cl. .......... 137/9; 73/861.19; 137/607; 251/129.08

[58] Field of Search .......... 137/3, 9, 101.19, 101.21, 137/607; 251/129.08; 73/861.19, DIG. 4

[56] References Cited

U.S. PATENT DOCUMENTS 3,474,815 10/1969 Beahm et al. .......... 137/101.19
4,258,565 3/1981 Sawayama et al. .......... 73/DIG. 4
4,411,406 10/1983 Inada et al. .......... 137/129.08 X
4,487,333 12/1984 Pounder et al. .......... 73/861.02 X
4,550,614 11/1985 Herzl .......... 73/861.19
4,699,012 10/1987 Lew et al. .......... 73/DIG. 4

*Primary Examiner*—Stephen M. Hepperle
*Attorney, Agent, or Firm*—Thomas R. Boston; W. Dexter Brooks

[57] ABSTRACT

A postmix beverage dispenser valve including a fluidic oscillator flowmeter in conjunction with a master controller and a flow control valve such as a proportional solenoid. The frequency of the syrup oscillations in the fluidic oscillator is linearly related to the syrup velocity and thus to the volume flow rate. Various sensors can be used to detect the fluid oscillations with the preferred one being a piezo electric film transducer having a protective coating and used with a flex cavity in the conduit wall. A pressure compensation device can be used to isolate the solenoid armature from varying syrup pressures.

6 Claims, 6 Drawing Sheets

BEVERAGE DISPENSING VALVE

This application is a continuation in part of Ser. No. 112,906, now abandoned, filed Oct. 23, 1987.

BACKGROUND OF THE INVENTION

The present invention relates to post-mix beverage dispenser valves such as for soft drinks and juices, and in particular to the use of a fluidic oscillator as a volumetric flowmeter and a piezo electric film transducer as a flow sensor in such a valve.

Traditional post-mix beverage dispensing valves include separate water (carbonated or still) and syrup (or concentrate) conduits and separate flow regulators located therein upstream of electrically or mechanically actuated on/off control valves. Each flow regulator utilizes a spring-loaded cylindrical piston as a combination of force and valving element; the piston is able to reciprocate freely within the cylinder and respond to the pressure difference at the two ends of the cylinder, as shown, for example, in U.S. Pat. Nos. 4,230,147; 3,422,842; and 2,984,261. The function of the piston and cylinder assembly is to maintain a constant pressure differential across the metering orifice machined directly in the face of the cylindrical piston, and to thus provide a constant flow regardless of the fluid pressure changes at the dispensing valve inlets. The flow regulator components operate at low force levels and operation at low force levels has a drawback of fostering hysteresis because of contaminants interposed between moving parts, and close fit between the parts themselves. Furthermore, it has been experienced that free pistons sometimes tend to stick in the regulator cylinder without regard to fit and finishing of the piston and the cylinder.

More recently, improvements in such valves to control the ratio of water to syrup have included the use of flow meters and control elements, as shown, for example, in U.S. Pat. No. 4,487,333. The known flow meters are relatively expensive and include moving parts.

SUMMARY OF THE PRESENT INVENTION

A postmix beverage dispenser valve using a fluidic oscillator as a flowmeter and a piezo electric film transducer as a flow sensor in conjunction with a flow control means. This system provides greater accuracy, lower cost, and higher reliability, because of the use of the fluidic oscillator which has no moving parts.

It is an object of the present invention to overcome some of the problems in postmix beverage dispensing valves using either the above-mentioned flow regulators or the known flow meters.

It is a further object of this invention to provide a postmix beverage dispensing valve incorporating a fluidic oscillator as a volumetric flowmeter working in conjunction with a flow control element to measure and modulate the flow of carbonated water and syrup through the valve.

It is another object of this invention to provide a flowmeter for a postmix beverage dispenser that has lower cost, higher reliability and greater accuracy.

It is a still further object of the present invention to provide a very inexpensive flow sensor, in the form of a piezo electric film transducer, in a beverage dispenser valve, and preferably in combination with the fluidic oscillator of this invention.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENTS

Figure 4:
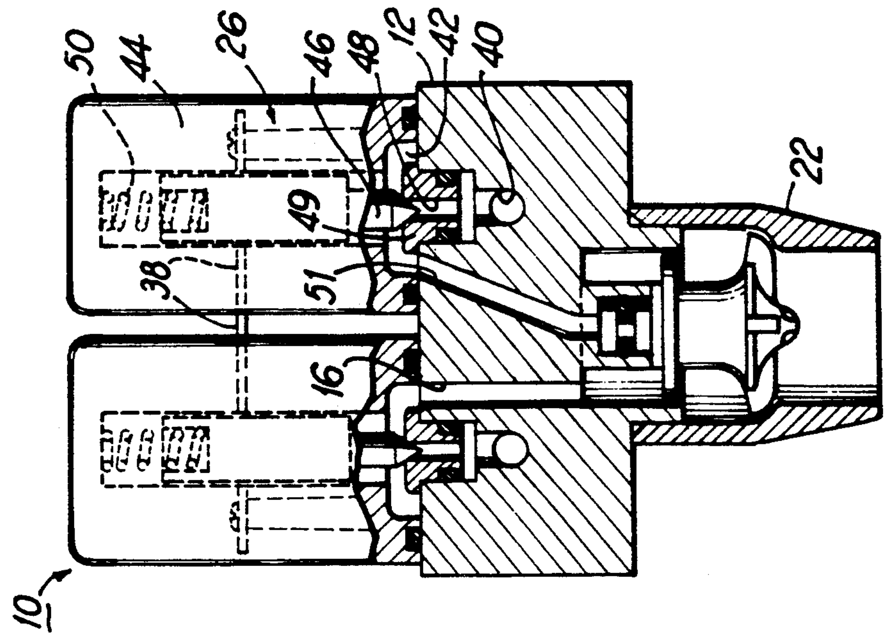
FIG. 4 is a partly cross-sectional front elevational view of the valve of FIG. 3 taken along line 4—4 of FIG. 3.
Figure 3:
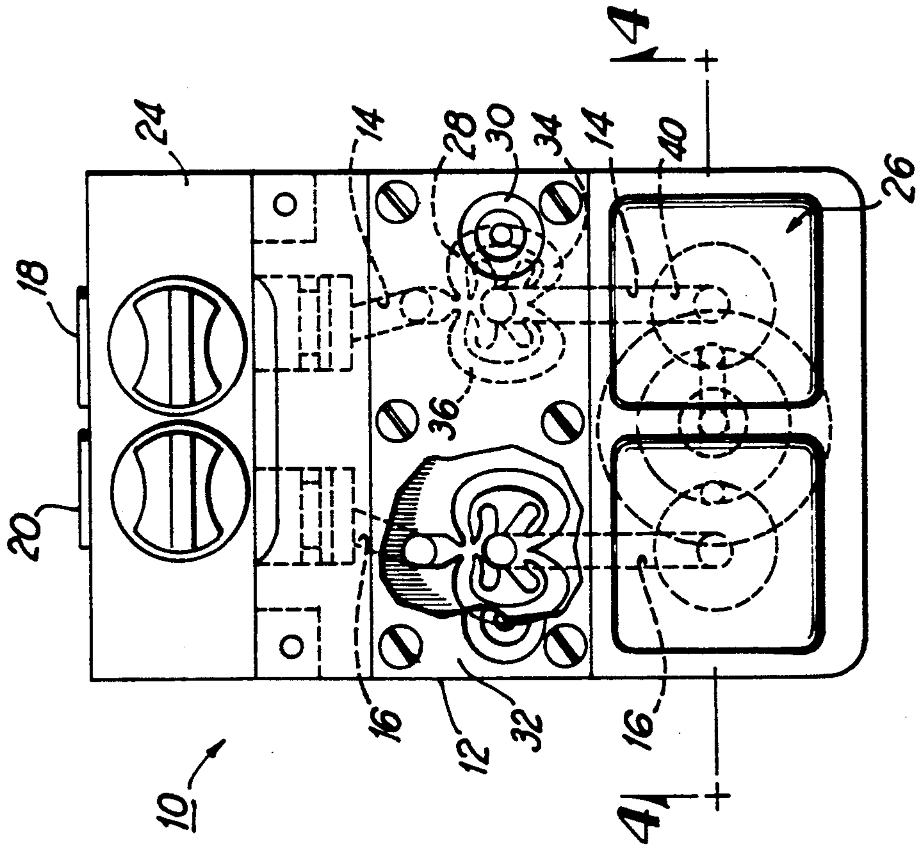
FIG. 3 is a top plan view of a postmix beverage dispenser valve according to the present invention.

With reference now to the drawings, FIGS. 3 and 4 show a postmix beverage dispenser valve 10 according to the present invention.

The valve 10 includes a body 12 having a syrup conduit 14 and a separate water conduit 16 extending therethrough from syrup and water inlet ports 18 and 20, respectively, to a mixing nozzle 22. Each conduit includes a fluidic oscillator flowmeter therein upstream from a flow controller. Because these features are identical in the two conduits, a description of only one will be sufficient.

Pressurized syrup is delivered to the syrup inlet port 18 located in a detachable dispensing valve mounting block 24, flows through the syrup conduit 14, through the syrup fluidic oscillator 28, and then enters a syrup control valve 26. Fluid oscillations are sensed by a sensor 30 located in a sensor plate 32, which is attached to the valve body 12 by screws. The sensor 30 is able to detect the changes in one of the feedback branches 34 and 36 in the fluidic oscillator 28. The frequency of the syrup oscillations is linearly related to the syrup velocity and hence to the volume flow rate. Because of the fact that the syrup velocity and pressure in the flowmeter 28 feedback branches 34 and 36 cycle between their minimum and maximum values, a variety of different types of sensors can be used to determine oscillation frequency. Pressure, thermistor, resistance temperature sensors, or other suitable means of detecting fluid oscillations can be employed, provided that the sensor output is an electrical quantity which can be accepted by a master controller 38 mounted directly above the dispensing valve body 12. One useful sensor 30 is a resistance temperature detector (RTD), such as temperature sensitive grids (ETG-50) by Micro-Measurements, Inc.

Figure 1:
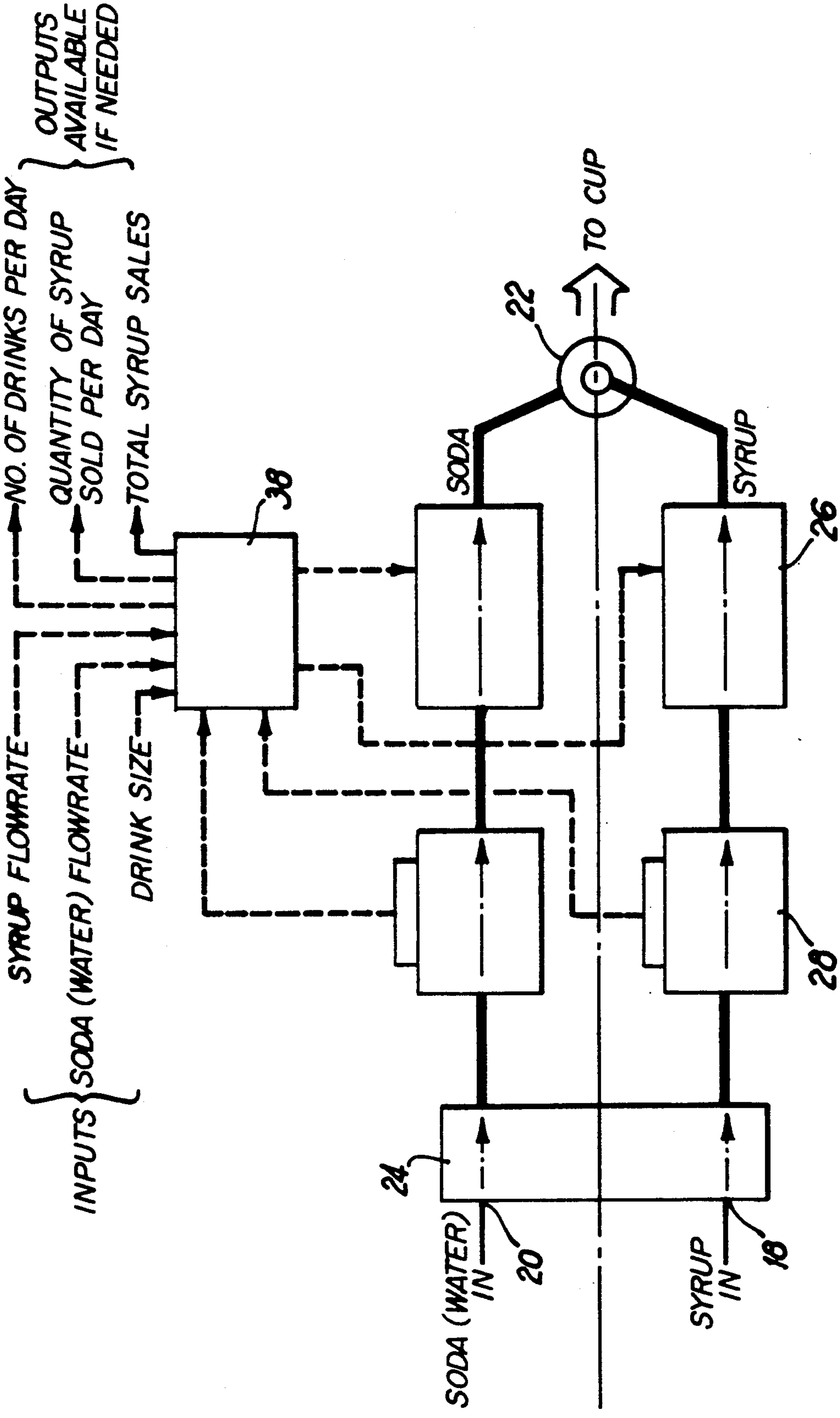
FIG. 1 is a block diagram illustrating the operation of the postmix beverage dispenser valve of the present invention.
Figure 2:
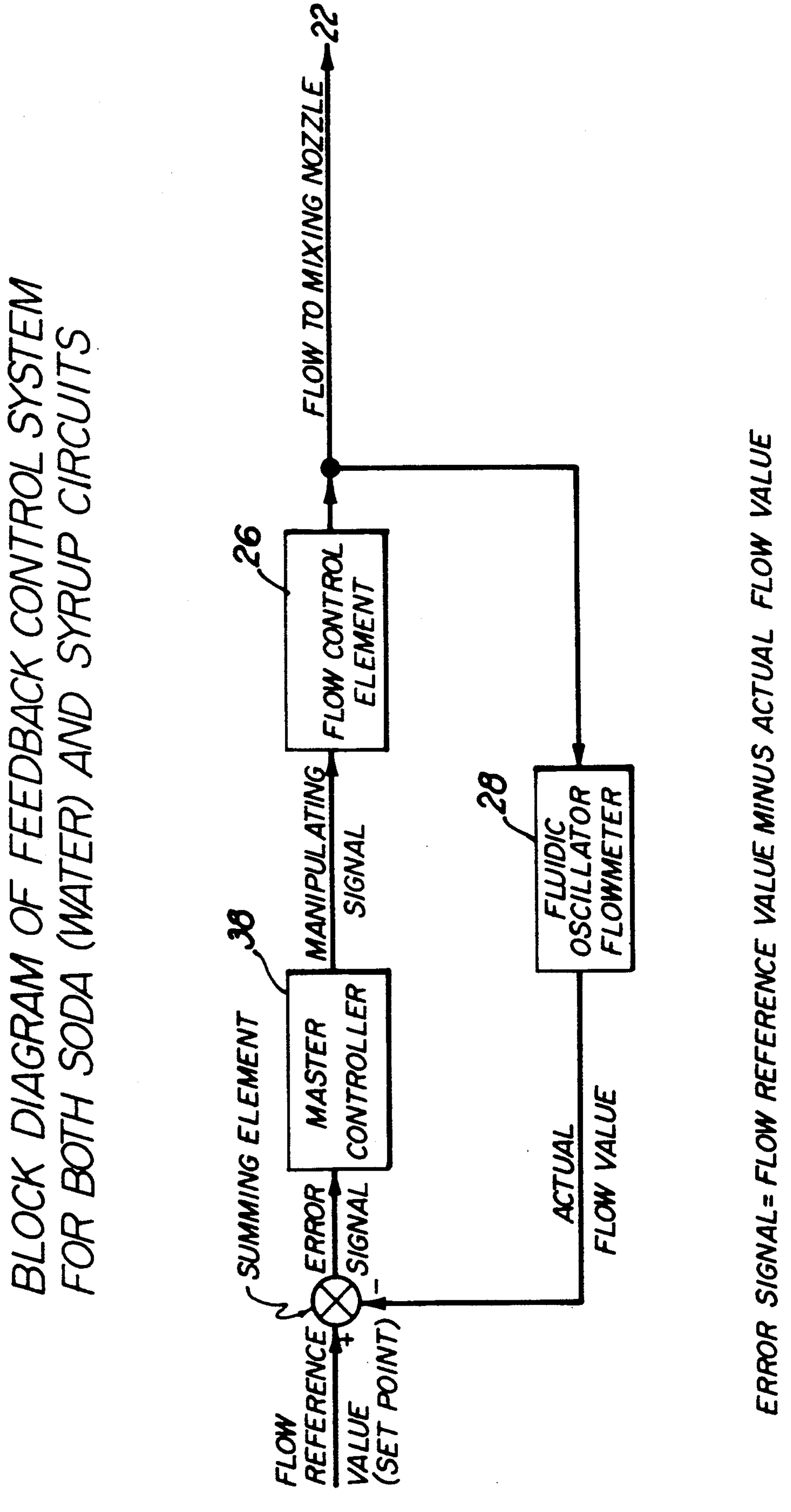
FIG. 2 is a block diagram showing the closed loop feedback control of the present invention.

With reference now also to FIGS. 1 and 2, the electrical signal from the sensor 30 representing actual syrup flow rate through the dispensing valve 10 is compared by the master controller 38 with a flow reference value, as illustrated in FIG. 2. If the actual flow value is not equal to the reference set point value, the error signal is processed by the controller 38 and the resulting manipulating signal acts on the syrup control valve 26 to correct the actual flow rate. If the desired flow rate reference value is kept constant, the controller action will provide constant syrup flow rate equal to the set point.

After leaving the fluidic oscillator 28, the syrup follows a channel 40 portion of the conduit 14 (see FIGS. 3 and 4) and enters a control chamber 42. FIG. 4 shows a proportional solenoid 44 with a spring loaded armature 46 working as the control valve element. The proportional solenoid 44 is a readily available commercial product. The master controller 38, which will preferably include a microprocessor, generates the manipulating signal in a form wherein the voltage periodically energizes the solenoid 44 for a set interval of time. The position of the solenoid armature 46 in relation to the orifice 48 in the valve seat 49 can be varied by changing the width of the pulses sent to the solenoid coil in response to the error signal. If the solenoid coil is not energized, the solenoid armature 46 is seated in the orifice 48 by a spring 50 located on the top of the armature 46.

The proportional solenoid armature 46 as shown in FIG. 4 is subjected to varying pressure drop between the channel 40 and a channel 51 downstream from the orifice 48. The pressure of the flowing syrup in the channel 51 and in the mixing nozzle 22 is low and close to atmospheric pressure. The pressure in channel 40 is highly dependent on the syrup pressure applied to the dispensing valve 10 and to the pressure loss in the fluidic oscillator 28. Therefore, the controller 38, whose task is to minimize the error signal, must compensate for the varying force created by the pressure drop and the plunger spring 50.

Figure 5:
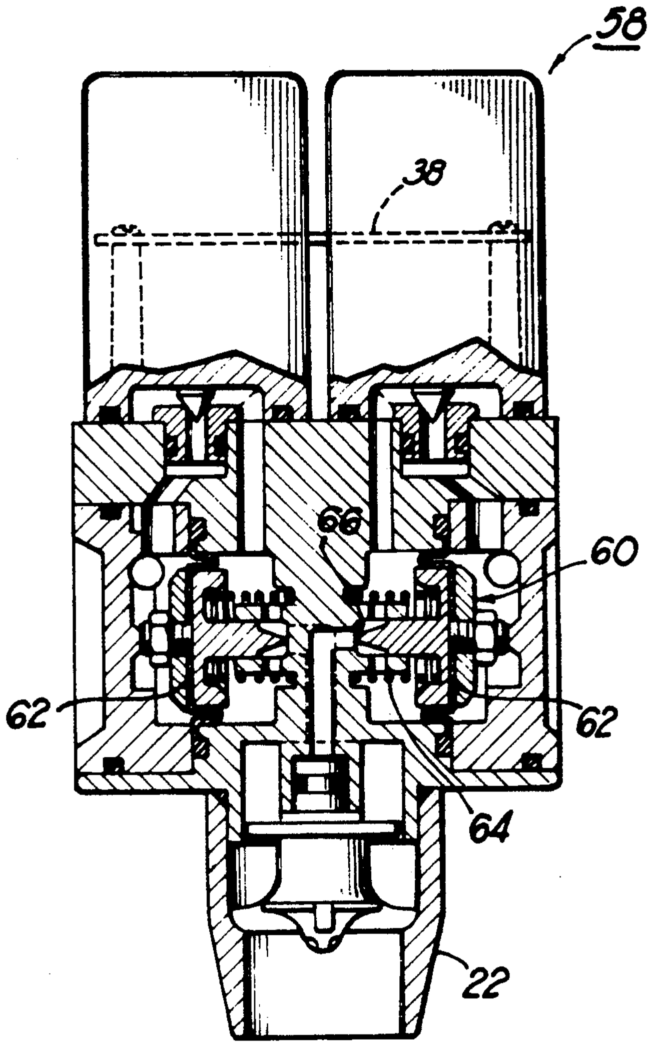
FIG. 5 is a partly cross-sectional front elevational view similar to that shown in FIG. 4 but of an alternative embodiment.
Figure 6A:
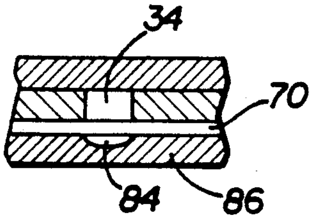
FIG. 6A is a partial cross-sectional view through a sensor 70 located on the position of the sensor 30 of FIG. 3 taken along line 6—6 thereof.
Figure 6B:
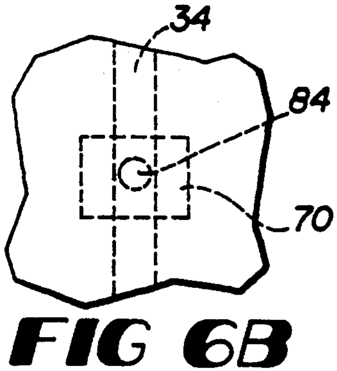
FIG. 6B is a partial plan view of the sensor 70.
Figure 7:
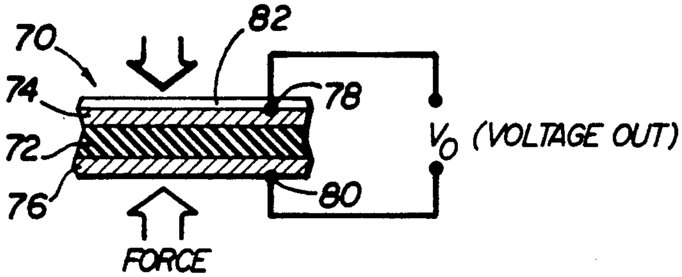
FIG. 7 is a partial cross-sectional view through the film transducer 70 of FIG. 6.

FIG. 5 shows a valve 58, which is an alternative embodiment for isolating the armature 46 from the varying syrup pressure, by means of a pressure compensation device 60. FIG. 5 shows a diaphragm and control plunger assembly 62, a control spring 64, and an outlet orifice 66, all of which comprise the pressure compensating device 60 which maintains a small and constant pressure drop at the orifice 48, thus relieving the solenoid armature 46 from changing pressures. The pressure drop at the orifice 48 can be determined by the spring 64 and the working area of the diaphragm itself.

The water side of the dispensing valves 10 and 58 operate the same as the syrup side described above, and therefore a detailed description thereof is not necessary.

In addition, as shown in FIG. 1, the master controller can, if desired, provide information on the number of drinks per day, quantity of syrup sold per day, and total syrup sales.

A preferred transducer 70 for use as the sensor 30 will now be described with reference to FIGS. 6–9. The preferred transducer 70 is a piezo-electric film transducer. The film transducer 70 includes a middle layer 72 of piezo electric material such as PVDF sandwiched between a pair of metal layers 74 and 76 such as of silver. Electrodes 78 and 80 are connected to the layers 74 and 76, respectively, for feeding the signals to the master controller 38.

The preferred piezo electric material is PVDF or polyvinylidene flouride which is a long chain semi-crystalline polymer of the repeat unit ($CH_2$—$CF_2$).

Units of the monomer, vinylidene fluoride $CH_2$=$CF_2$, polymerize in an orderly fashion to give greater than 90% head-to-tail configuration: —$CH_2$—$CF_2$—$CH_2$—$CF_2$—. For this reason, the polymer exhibits the unusually high net dipole moment of its monomer constituent—about $7.56\times10^{-30}$ C-m.

The properties of PVDF, including piezoelectricity, depend heavily on the degree and type of its crystalline structure. Three common crystalline phases for the material are designated alpha, beta and gamma.

The non-polar alpha phase, the most common, results when the polymer is cooled from its melt. The beta phase materializes after deformation of the alpha crystallites. For example, stretching of extruded PVDF film at temperatures below its melting point causes a packing of unit cells in parallel planes to give the polar beta phase.

The gamma phase, which is also polar, has intermediate polarity between the alpha and beta phases. Mechanical deformation of the gamma phase polymer also yields beta phase crystallites.

To obtain significant piezoelectric and pyroelectric activities, beta phase polymer must be "poled." Poling exposes the polymer to a high electric field at elevated temperatures. The level of piezo activity obtained by poling depends upon poling time, field strength and temperature. When conducted properly, the poling process provides a permanent orientation of molecular dipoles within the polymer.

A working voltage applied to the electrodes of piezo film causes the film to elongate or contract, depending on the field's polarity. Exposed to an alternating field, the film elongates and contracts as the field polarity changes.

Conversely, when an external force applied to the film results in compressive or tensile strain, the film develops a proportionate open circuit voltage. Exposure to a reciprocating force results in a corresponding alternating electrical signal. The frequency response ranges widely—0.005 Hz to gigahertz. The film is also characterized by a low Q. The basic half wavelength thickness resonance of 28 $\mu$m piezo film is about 40 MHz.

Pennwalt sells such a piezo film under the trademark KYNAR.

KYNAR Piezo Film is available in the following thicknesses expressed in microns ($1\times10^{-6}$m): 9,16,28,52,110 and 220. Thicker films, 600 to 1,000 $\mu$m, may be ordered by special arrangements.

For pyroelectric detectors, sensitivity requires a film that has rapid heat transfer through the film and low mass. Thin films (9 to 28 microns) are preferred.

KYNAR Piezo Films are coated on both sides with conductive metals such as silver or aluminum to provide intimate electrical contact. Two types of metallization are available: thin metal layers deposited by a vacuum metallization and thicker coatings deposited by spraying or by silk-screening with a conductive silver ink.

The preferred film transducer 70 has a thickness of about 28 microns with a vacuum metalized silver layer on each side with a thickness of less than 1000 Angstroms. The portion of the film transducer used in the conduit as the sensor is preferably circular with a diameter of just less than about ½ inch.

It is also preferred to include a water-proof protective coating 82, such as of polyurethane, over the surface of the film that is exposed to the liquid. It has been noted that there is a tendency for the metallic layer to deteriorate when exposed to liquids (the syrup or the soda). The protective coating 82 can be applied over the entire film transducer rather than just one side.

In addition, it is preferred to provide a flex cavity 84 in the side wall 86 of the conduit 34 overlayed by the film transducer 70 to allow the transducer to flex freely. The flex cavity 84 is preferably circular and has a depth of about 0.030 inch and a diameter of about 1/16 inch. The use of the flex cavity provides a higher output signal.

Figure 9:
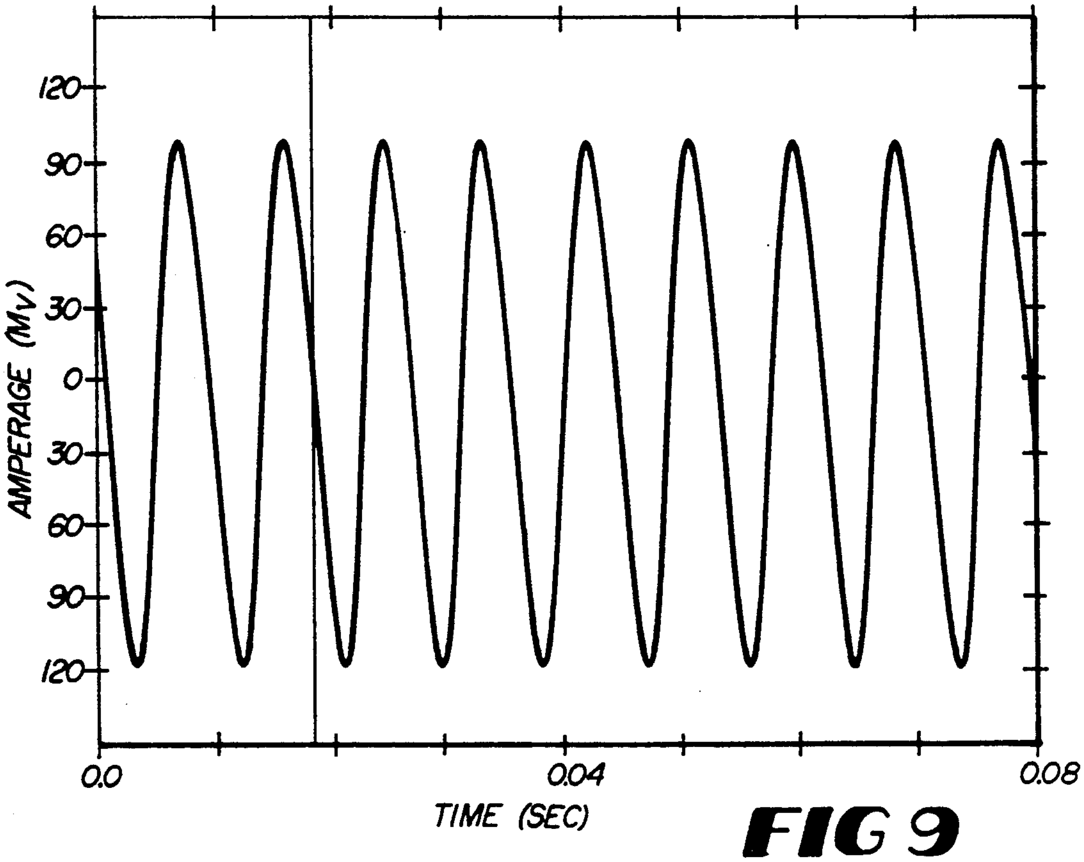
FIG. 9 is a graph of a typical waveform output by the film transducer using the filter/amplifier of FIG. 8.
Figure 8:
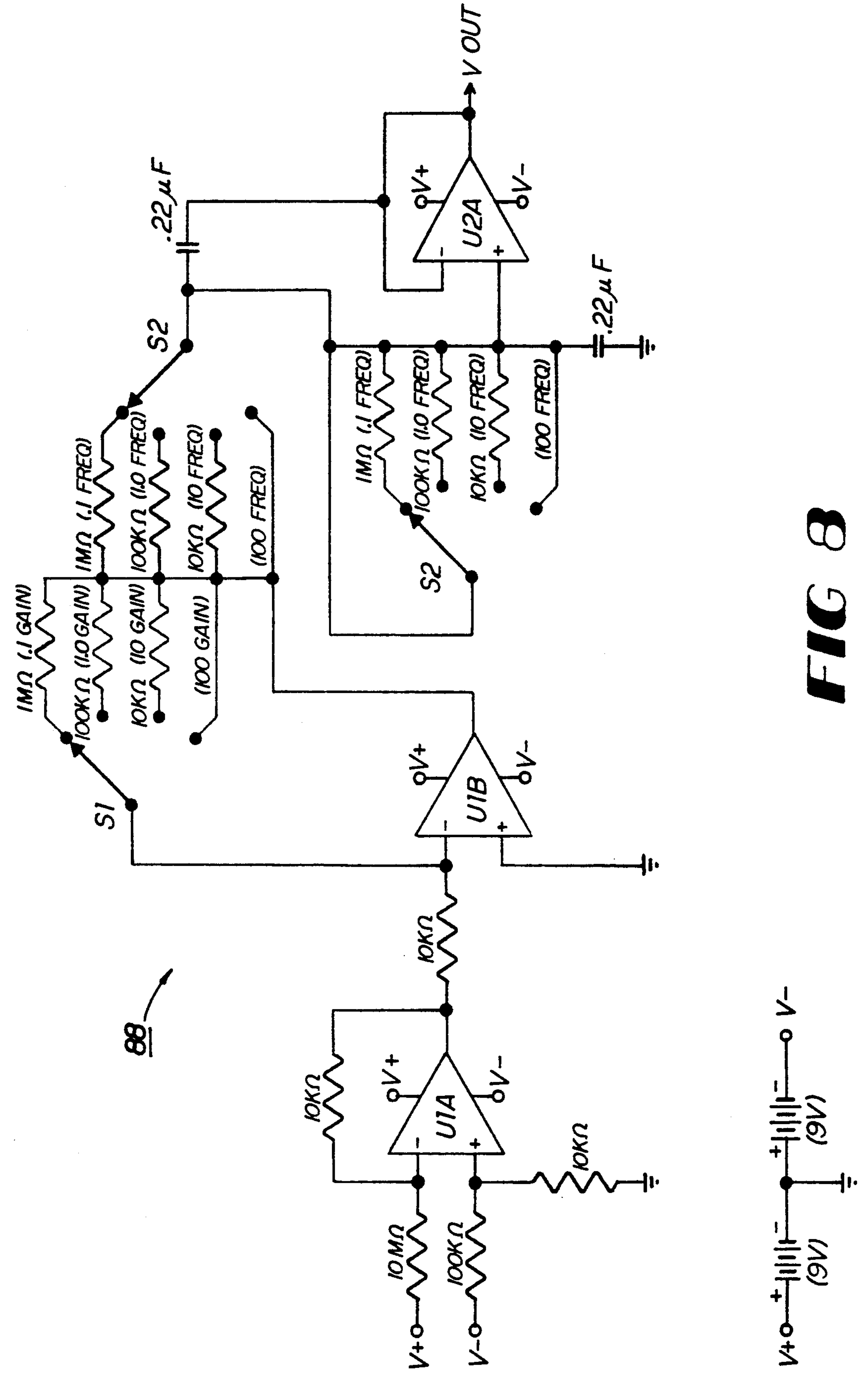
FIG. 8 is a schematic circuit diagram of a filter/amplifier 88 useful with the film transducer 70.

This film transducer 70 has proven to be an ideal, low-cost transducer for this application. Each transducer would require approximately one $cm^2$ of film (which would cost less than about twenty cents). With the use of a simple filter/amplifier 88, as shown in FIG. 8, the film transducer puts out a clean signal with a frequency that is easily picked up by a frequency counter. FIG. 9 shows a typical waveform output by the film transducer 70 using the filter/amplifier of FIG. 8. The filter/amplifier 88 is straightforward and its operation will be easily understood by anyone skilled in the art. The filter/amplifier 88 takes the output signal from the film transducer 70, amplifies it and low pass filters it according to the switch settings.

While the preferred embodiments of this invention have been described above in detail, it is to be understood that variations and modifications can be made therein without departing from the spirit and scope of the present invention.

What is claimed is:

1. A postmix beverage dispenser valve comprising:

(a) a body having a syrup conduit and a water conduit therethrough for carrying syrup and water, respectively, from respective inlet ports to a mixing nozzle;

(b) a fluidic oscillator flowmeter in at least one of said conduits for measuring the flow therethrough and including a sensor for generating electrical signals corresponding to the said flow;

(c) a controller connected to said sensor for receiving signals therefrom and for generating control signals;

(d) flow control means in said at least one conduit downstream from said flowmeter and connected to said controller for receiving said control signals and for controlling the flow through said flow control means; and (e) said film transducer including two outer metal layers and an electrode connected to each of said metal layers.

2. The valve as recited in claim 1 including a protective coating on said film transducer on the side thereof exposed to said conduit.

3. The valve as recited in claim 2 wherein said coating is a waterproof layer of polyurethane.

4. A flow sensor for a beverage dispenser valve comprising a body, a liquid conduit, said film transducer including two outer metal layers and an electrode connected to each of said metal layers extending through said body, a piezo electric film transducer in said conduit.

5. The flow meter as recited in claim 4 including a protective coating on the side of said metal layer of said film transducer facing into said conduit.

6. The flow meter as recited in claim 4 wherein said film transducer is in contact with a wall of said conduit and including a flex cavity in said wall overlayed by said film transducer.

* * * * *

UNITED STATES PATENT AND TRADEMARK OFFICE

CERTIFICATE OF CORRECTION

PATENT NO. : 5,179,970

DATED : Jan. 19, 1993

INVENTOR(S) : George J. Jarocki et al.

It is certified that error appears in the above-identified patent and that said Letters Patent is hereby corrected as shown below:

Column 6:

In claim 4, line 2, after "conduit" insert --extending through said body, a piezo electric film transducer in said conduit--.

In claim 4, line 4, delete "extending through".

In claim 4, lines 5-6, delete "said body, a piezo electric film transducer in said conduit".

Signed and Sealed this

Thirtieth Day of November, 1993

Attest:

Bruce Lehman

BRUCE LEHMAN

Attesting Officer

Commissioner of Patents and Trademarks